(12) United States Patent
Chiang et al.

(10) Patent No.: US 11,749,892 B2
(45) Date of Patent: Sep. 5, 2023

(54) ANTENNA STRUCTURE AND ELECTRONIC DEVICE

(71) Applicant: WISTRON NEWEB CORPORATION, Hsinchu (TW)

(72) Inventors: Cheng-Wei Chiang, Hsinchu (TW); Ching-Wen Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 81 days.

(21) Appl. No.: 17/472,745

(22) Filed: Sep. 13, 2021

(65) Prior Publication Data

US 2022/0294113 A1 Sep. 15, 2022

(30) Foreign Application Priority Data

Mar. 10, 2021 (TW) .................. 110108449

(51) Int. Cl.
| | | |
|---|---|---|
| H01Q 5/328 | (2015.01) | |
| H01Q 5/371 | (2015.01) | |
| H01Q 5/385 | (2015.01) | |
| H01Q 9/26 | (2006.01) | |
| H04B 1/00 | (2006.01) | |

(52) U.S. Cl.
CPC ............ *H01Q 5/328* (2015.01); *H01Q 5/371* (2015.01); *H01Q 5/385* (2015.01); *H01Q 9/26* (2013.01); *H04B 1/006* (2013.01)

(58) Field of Classification Search
CPC ........ H01Q 5/328; H01Q 5/371; H01Q 5/385; H01Q 9/26; H04B 1/006
USPC ...................................................... 343/850
See application file for complete search history.

(56) References Cited

U.S. PATENT DOCUMENTS

| | | | |
|---|---|---|---|
| 10,193,597 B1* | 1/2019 | Garrido Lopez | ........ H04B 1/38 |
| 10,741,915 B2 | 8/2020 | Chen et al. | |
| 11,539,123 B2* | 12/2022 | Hu | .......... H01Q 5/385 |
| 2013/0257679 A1 | 10/2013 | Wong et al. | |
| 2015/0303568 A1* | 10/2015 | Yarga | ..... H01Q 5/321 |
| | | | 343/722 |

FOREIGN PATENT DOCUMENTS

| | | |
|---|---|---|
| TW | M533332 U | 12/2016 |
| TW | 202023113 A | 6/2020 |

* cited by examiner

*Primary Examiner* — Dimary S Lopez Cruz
*Assistant Examiner* — Brandon Sean Woods
(74) *Attorney, Agent, or Firm* — McClure, Qualey & Rodack, LLP (57) ABSTRACT

An antenna structure and an electronic device are provided. The antenna structure includes a first radiating member, a second radiating member, a grounding member, and a capacitance element. The first radiating member includes a first radiating part, a second radiating part, a feeding part, and a grounding part. The second radiating member is coupling to the first radiating member. The second radiating member includes a third radiating part and a main body part that are connected to each other. There is a first predetermined length between a feeding point of the feeding part and an open end of the second radiating part. There is an electrical length between a connection point where the main body part is electrically connected to the capacitance element and an open end of the third radiating part. The electrical length is greater than the first predetermined length.

17 Claims, 11 Drawing Sheets

ANTENNA STRUCTURE AND ELECTRONIC DEVICE

CROSS-REFERENCE TO RELATED PATENT APPLICATION

This application claims the benefit of priority to Taiwan Patent Application No. 110108449, filed on Mar. 10, 2021. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly to an electronic device having an antenna structure.

BACKGROUND OF THE DISCLOSURE

Recently, not only do electronic devices, such as laptops, have a lighter design and a thinner appearance, high performance must also be taken into consideration. However, an antenna structure in the electronic devices is designed to meet a demand for low profile height, resulting in a significant shortage of bandwidth (especially at high frequencies).

Therefore, how to improve a communication quality of the electronic devices through an improvement of an antenna structure design to overcome the abovementioned issue has become one of the important issues in the related art.

SUMMARY OF THE DISCLOSURE

In response to the above-referenced technical inadequacy the present disclosure provides an antenna structure and an electronic device.

In one aspect, the present disclosure provides an antenna structure that includes a first radiating member, a second radiating member, a grounding member, and a capacitance element. The first radiating member includes a first radiating part, a second radiating part, a feeding part, and a grounding part. The feeding part is electrically connected between the first radiating part and the second radiating part, and one end of the grounding part is electrically connected between the first radiating part and the second radiating part. The second radiating member is coupling to the first radiating member. The second radiating member includes a third radiating part and a main body part that is electrically connected to the third radiating part. The third radiating part and the second radiating part are separate from each other and coupling to each other. The grounding member is electrically connected to a grounding end of a feeding member. Another end of the grounding part is electrically connected to the grounding member. The capacitance element is connected between the second radiating member and the grounding member. The feeding part has a feeding point. There is a first predetermined length between the feeding point and an open end of the second radiating part, and there is an electrical length between a connection point where the main body part is electrically connected to the capacitance element and an open end of the third radiating part. The electrical length is greater than the first predetermined length.

In another aspect, the present disclosure provides an electronic device that includes an antenna structure. The antenna structure includes a first radiating member, a second radiating member, a grounding member, and a capacitance element. The first radiating member includes a first radiating part, a second radiating part, a feeding part, and a grounding part. The feeding part is electrically connected between the first radiating part and the second radiating part, and one end of the grounding part is electrically connected between the first radiating part and the second radiating part. The second radiating member is coupling to the first radiating member. The second radiating member includes a third radiating part and a main body part that is electrically connected to the third radiating part. The third radiating part and the second radiating part are separate from each other and coupling to each other. The grounding member is electrically connected to a grounding end of a feeding member. Another end of the grounding part is electrically connected to the grounding member. The capacitance element is connected between the second radiating member and the grounding member. The feeding part has a feeding point. There is a first predetermined length between the feeding point and an open end of the second radiating part, and there is an electrical length between a connection point where the main body part is electrically connected to the capacitance element and an open end of the third radiating part. The electrical length is greater than the first predetermined length.

Therefore, one of the beneficial effects of the present disclosure is that, in the antenna structure and the electronic device provided by the present disclosure, by virtue of "the third radiating part of the second radiating member and the second radiating part of the first radiating member being separate from each other and coupling to each other" and "there being the first predetermined length between the feeding point of the feeding part and the open end of the second radiating part, there being the electrical length between the connection point where the main body part is electrically connected to the capacitance element and the open end of the third radiating part, and the electrical length being greater than the first predetermined length", the antenna structure of the electronic device generates an operating frequency band of a frequency ranging from 1710 MHz to 2690 MHz in compliance with a gain specification.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like. In addition, the term "connect" can be used to describe a physical connection directly or indirectly between two components, and the term "couple" can be used to describe a separation between two components without any physical connections, which an electrical field energy generated by a current from one component excites an electrical field energy of another component.

First Embodiment

Figure 1:
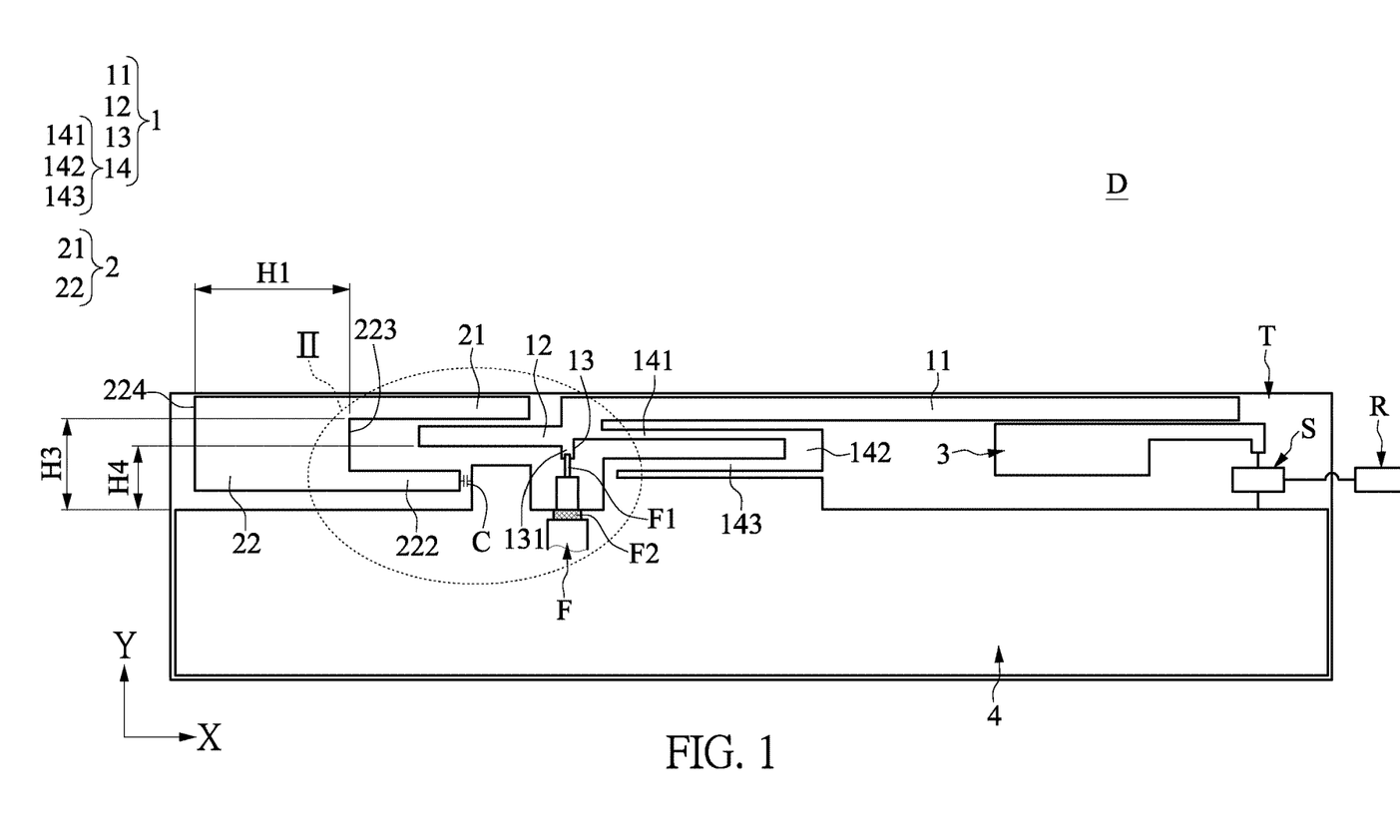
FIG. 1 is a schematic top view of an antenna structure according to a first embodiment of the present disclosure.

Referring to FIG. 1, a first embodiment of the present disclosure provides an electronic device D including an antenna structure. The antenna structure includes a first radiating member 1, a second radiating member 2, and a grounding member 4. In addition, the antenna structure can also include a substrate T, and the first radiating member 1, the second radiating member 2, and the grounding member 4 can be disposed on the substrate T. The first radiating member 1 includes a first radiating part 11, a second radiating part 12, a feeding part 13, and a grounding part 14. The feeding part 13 is electrically connected between the first radiating part 11 and the second radiating part 12. One end of the grounding part 14 is electrically connected between the first radiating part 11 and the second radiating part 12, and another end of the grounding part 14 is electrically connected to the grounding member 4.

The first radiating part 11 extends along a first direction (a positive X direction) relative to the feeding part 13, and the second radiating part 12 extends along a second direction (a negative X direction) relative to the feeding part 13. That is to say, the first radiating part 11 is parallel to the second radiating part 12, the first direction is opposite to the second direction, and a length of the first radiating part 11 extending along the first direction is greater than a length of the second radiating part 12 extending along the second direction. In addition, the feeding part 13 can extend along a third direction (a negative Y direction) relative to a connection point between the feeding part 13 and the second radiating part 12. Furthermore, in the present embodiment, the grounding part 14 is an extended area in a shape of an inverted U, which includes a first segment 141 that is connected between the first radiating part 11 and the feeding part 13, a second segment 142 that is connected to the first segment 141 and turned relative to the first segment 141, and a third segment 143 that is connected to the second segment 142 and turned relative to the second segment 142. In this way, the first radiating member 1 of the present disclosure can be a planar inverted-F antenna (PIFA) structure, but the present disclosure is not limited thereto.

Figure 2:
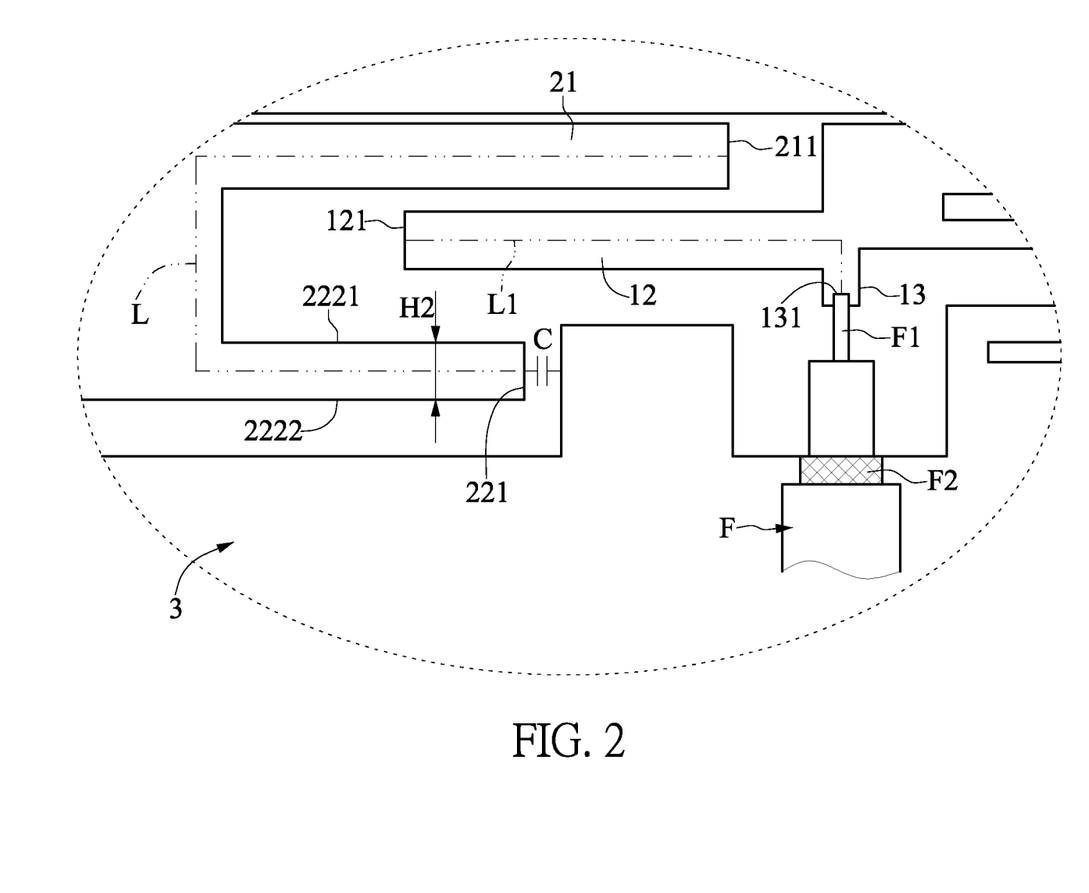
FIG. 2 is an enlarged view of part II of FIG. 1.

Referring further to FIG. 1, which is to be read in conjunction with FIG. 2, FIG. 2 is an enlarged view of part II of FIG. 1. The second radiating member 2 can be arranged adjacent to the first radiating member 1, and the second radiating member 2 is coupling to the first radiating member 1. The second radiating member 2 includes a third radiating part 21 and a main body part 22 electrically connected to the third radiating part 21. The third radiating part 21 of the second radiating member 2 and the second radiating part 12 of the first radiating member 1 are separate from each other and coupling to each other. In addition, the antenna structure further includes a capacitance element C connected between the second radiating member 2 and the grounding member 4. The main body part 22 includes a fourth radiating part 222 that is electrically connected between the main body part 22 and the capacitance element C. The main body part 22 has a first side 223 connected to the third radiating part 21 and a second side 224, and the first side 223 is arranged opposite to the second side 224. The fourth radiating part 222 is connected to the first side 223 and parallel to the third radiating part 21. In addition, the third radiating part 21 and the fourth radiating part 222 both extend along the first direction (the positive X direction) relative to the main body part 22, so that the second radiating member 2 is in the shape of the inverted U. The fourth radiating part 222 has a third side 2221 and a fourth side 2222 that are both connected to the main body part 22 and arranged opposite to each other. Furthermore, there is a first predetermined distance H1 between the first side 223 and the second side 224, there is a second predetermined distance H2 between the third side 2221 and the fourth side 2222, and the first predetermined distance H1 is greater than twice the second predetermined distance H2.

As mentioned above, furthermore, there is a third predetermined distance H3 between the third radiating part 21 and the grounding member 4, there is a fourth predetermined distance H4 between the second radiating part 12 and the grounding member 4, and the third predetermined distance H3 is not equal to the fourth predetermined distance H4. It is worth mentioning that, in the present embodiment, the third predetermined distance H3 is greater than the fourth predetermined distance H4, that is, the third radiating part 21 is further away from the grounding member 4 than the second radiating part 12, such that a gain in a high frequency bandwidth ranging from 1710 MHz to 2300 MHz generated by coupling the third radiating part 21 to the second radiating part 12 is increased.

Referring further to FIG. 2, the feeding part 13 has a feeding point 131, and the feeding point 131 is a point where a feeding end F1 of a feeding member F is connected to the feeding part 13. In other words, the feeding member F is electrically connected to the feeding end F1 through the feeding point 131, so as to transmit signals into the feeding part 13. There is a first predetermined length L1 between the feeding point 131 and an open end 121 of the second radiating part 12, there is an electrical length L between a connection point 221 of the main body part 22 is electrically connected to the capacitance element C and an open end 211 of the third radiating part 21, and the electrical length L is greater than the first predetermined length L1.

Referring further to FIG. 1, the electronic device D further includes the feeding member F, and the feeding member F has the feeding end F1 and a grounding end F2. The feeding end F1 is electrically connected to the feeding part 13, and the grounding end F2 is electrically connected to the grounding member 4. The electronic device D can feed the signals to the first radiating member 1 through the feeding member F, and use the first radiating member 1 to couple and excite the second radiating member 2. It is worth mentioning that, in one embodiment, the grounding member 4 can also be electrically connected to a metal member, and the metal member can be a housing of the electronic device D, but the present disclosure is not limited thereto. In addition, for example, the first radiating member 1, the second radiating member 2, and the grounding member 4 can be a metal sheet, a metal wire, or other electrical conductors with electrical conductivity. The feeding member F can be a coaxial cable, the substrate T can be a flame retardant 4 (FR4) substrate, a printed circuit board (PCB), or a flexible printed circuit board (FPCB), but the present disclosure is not limited thereto.

As mentioned above, the third radiating part 21 can generate a first central frequency, the second radiating part 12 can generate a second central frequency, and the first central frequency is different from the second central frequency. In addition, the third radiating part 21 excites a first operating frequency band with a frequency ranging between the first central frequency and the second central frequency through coupling to the second radiating part 12. For example, the third radiating part 21 can generate the first central frequency of about 1700 MHz, and the second radiating part 12 can generate the second central frequency of about 2500 MHz. The third radiating part 21 and the second radiating part 12 are separate from each other and coupling to each other, so as to excite the first operating frequency band of the frequency ranging from 1710 MHz to 2690 MHz. However, the present disclosure is not limited thereto. Moreover, in the present disclosure, through the technical feature that the first predetermined distance H1 is greater than twice the second predetermined distance H2, the high frequency bandwidth of the antenna structure can be further adjusted, so that the high frequency bandwidth thereof is greater than the range of 1710 MHz to 2690 MHz.

In addition, as mentioned above, the capacitance element C is connected to a conductive path that is between the second radiating member 2 and the grounding member 4. For example, a capacitance value of the capacitance element C is between 0.1 pF and 100 pF, and preferably, the capacitance value of the capacitance element C is between 3 pF and 20 pF, but the present disclosure is not limited thereto. In this way, through disposing the capacitance element C in the antenna structure, the high frequency bandwidth and an impedance matching of the antenna structure can be adjusted, and a noise interference caused by adjacent elements (such as magnets) can also be overcome, so as to achieve a high-pass filtering effect.

Referring further to FIG. 1, the antenna structure further includes a third radiating member 3 and a switching circuit S. The switching circuit S is electrically connected to the third radiating member 3. The third radiating member 3 is coupling to the first radiating member 1. Furthermore, the first radiating part 11 of the first radiating member 1 and the third radiating member 3 are separate from each other and coupling to each other. The first radiating part 11 generates a third central frequency, and excites a second operating frequency band through coupling to the third radiating member 3. For example, the first radiating part 11 can generate the third central frequency of about 824 MHz, and excites the second operating frequency band of the frequency ranging from 698 MHz to 960 MHz through being separated and coupling to the third radiating member 3. Next, through a switching of the switching circuit S, different central frequencies of the second operating frequency band can be further adjusted. For example, the switching circuit S has a first mode and a second mode. The first mode has a first path, and the second mode has a second path. The first path has a first impedance value, the second path has a second impedance value, and the first impedance value is different from the second impedance value.

As mentioned above, the electronic device D further includes a control circuit R. The control circuit R can control the switching circuit R to switch to one of the first mode and the second mode, so as to use the control circuit R to control the operating frequency band of the antenna structure. For example, the control circuit R can be a microcontroller or a circuit on a mainboard, so as to control the switching circuit R, but the present disclosure is not limited thereto.

Figure 3:
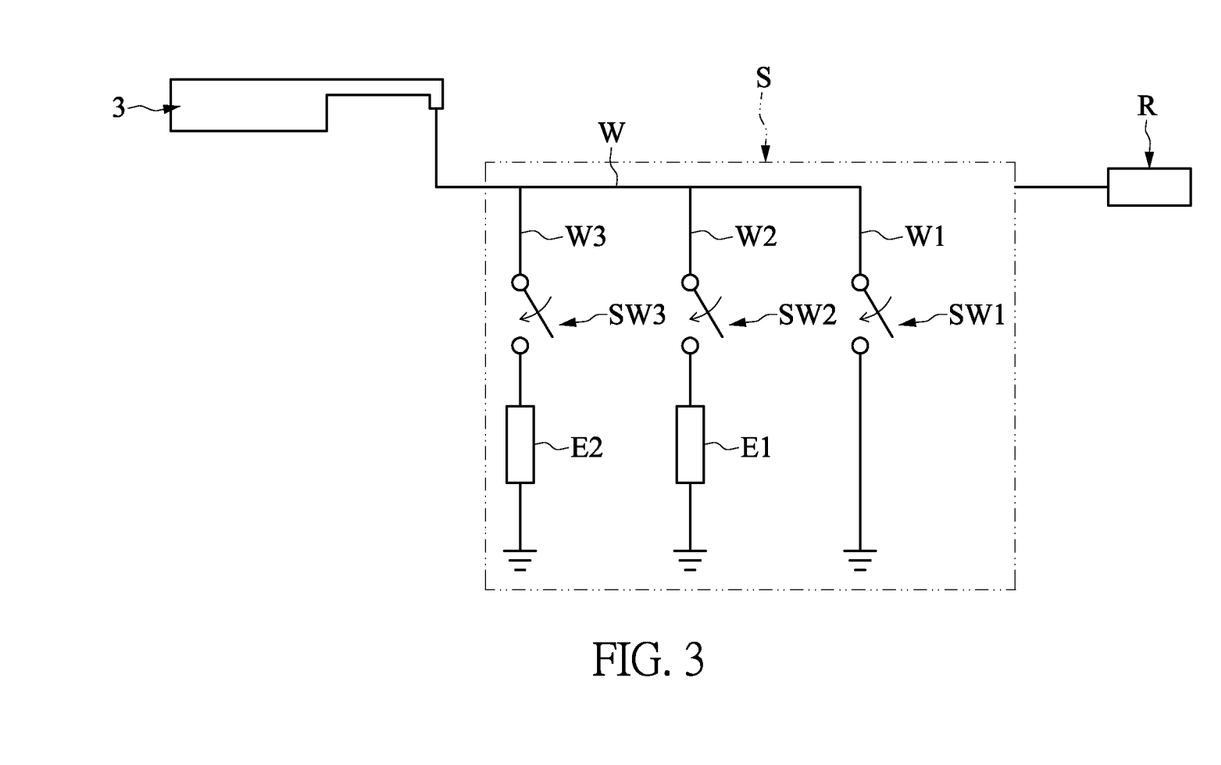
FIG. 3 is a schematic view of a switching circuit, a control circuit, and a third radiating member of FIG. 1.

Referring to FIG. 3, FIG. 3 is a schematic view of the switching circuit, the control circuit, and the third radiating member of FIG. 1. For example, the switching circuit S includes a signal transmission path W and at least one grounding path (for example, a first path W1, a second path W2 and/or a third path W3) that is electrically connected to the signal transmission path W. The at least one grounding path can be connected in series to a change-over switch (for example, a first change-over switch SW1, a second change-over switch SW2 and/or a third change-over switch). In addition, the grounding path can also be connected in series to a passive component (for example, a first passive component E1 and/or a second passive component E2) in addition to the change-over switch. For example, the passive component can be an inductor, a capacitance, or a resistance. The electronic device D can adjust the operating frequency band, the impedance matching, a return loss value, and/or a radiating effect of the antenna structure through disposing the passive component E therein. Moreover, the grounding path can also be provided to not include any passive components, that is, the present disclosure is not limited by whether or not the passive component is disposed in the electronic device D. Furthermore, the control circuit R can be used to control whether or not the at least one grounding path (for example, the first path W1, the second path W2 and/or the third path W3) is conducting, so as to take advantage of a selection of the at least one grounding path to control the switching circuit S to switch to one of the first mode and the second mode.

For example, as shown in FIG. 3, the switching circuit S includes the signal transmission path W, the first path W1, the second path W2, and the third path W3. The first path W1, the second path W2, and the third path W3 are correspondingly and electrically connected to the signal transmission path W, and the first path W1, the second path W2, and the third path W3 are connected in series to the first change-over switch SW1, the second change-over switch SW2, and the third change-over switch SW3, respectively. The passive component is not disposed on the first path W1, the second path W2 is connected in series to the first passive component E1, and the third path W3 is connected in series to the second passive component E2. The first passive component E1 on the second path W2 can be the inductor, and the second passive component E2 on the third path W3 can be the capacitance.

As mentioned above, in one of the mode switching embodiments, the first mode is that the third radiating member 3 is electrically connected to the control circuit R through the signal transmission path W, that is, the first mode is that the third radiating member 3 is electrically connected to the control circuit R through the signal transmission path W, while the first path W1, the second path W2, and the third path W3 are each in a breaking state.

As mentioned above, in one of the mode switching embodiments, the first mode is that the third radiating member 3 is electrically connected to the control circuit R, that is, the first mode is that the third radiating member 3 is electrically connected to the control circuit R, while the first path W1, the second path W2, and the third path W3 are each in a breaking state.

As mentioned above, referring again to FIG. 3, for example, in another one of the mode switching embodiments, the second mode is that the third radiating member 3 is electrically connected to the grounding member 4 through the first path W1, that is, the second mode is that the third radiating member 3 is electrically connected to the control circuit R, and the first path W1 is in a conducting state, while the second path W2 and the third path W3 are each in the breaking state.

As mentioned above, referring again to FIG. 3, for example, in yet another one of the mode switching embodiments, the third mode is that the third radiating member 3 is electrically connected to the grounding member 4 through the second path W2, that is, the third mode is that the third radiating member 3 is electrically connected to the control circuit R, and the second path W2 is in the conducting state, while the first path W1 and the third path W3 are each in the breaking state.

As mentioned above, referring again to FIG. 3, for example, in still yet another one of the mode switching embodiments, the fourth mode is that the third radiating member 3 is electrically connected to the grounding member 4 through the third path W3, that is, the fourth mode is that the third radiating member 3 is electrically connected to the control circuit R, and the third path W3 is in the conducting state, while the first path W1 and the second path W2 are each in the breaking state.

In this way, in the present embodiment, when the first path W1 is in the conducting state, and the second path W2 and the third path W3 are each in the breaking state, the central frequency of the operating frequency band ranging from 698 MHz to 960 MHz can be closer to that of 698 MHz. When the second path W2 is in the conducting state, and the first path W1 and the third path W3 are each in the breaking state, the central frequency of the operating frequency band ranging from 698 MHz to 960 MHz can be closer to that of 960 MHz, but the present disclosure is not limited thereto. In other words, the switching circuit S can adjust the central frequency of the second operating frequency band through selecting one of the first passive element E1 and the second passive element E2.

Second Embodiment

Figure 4:
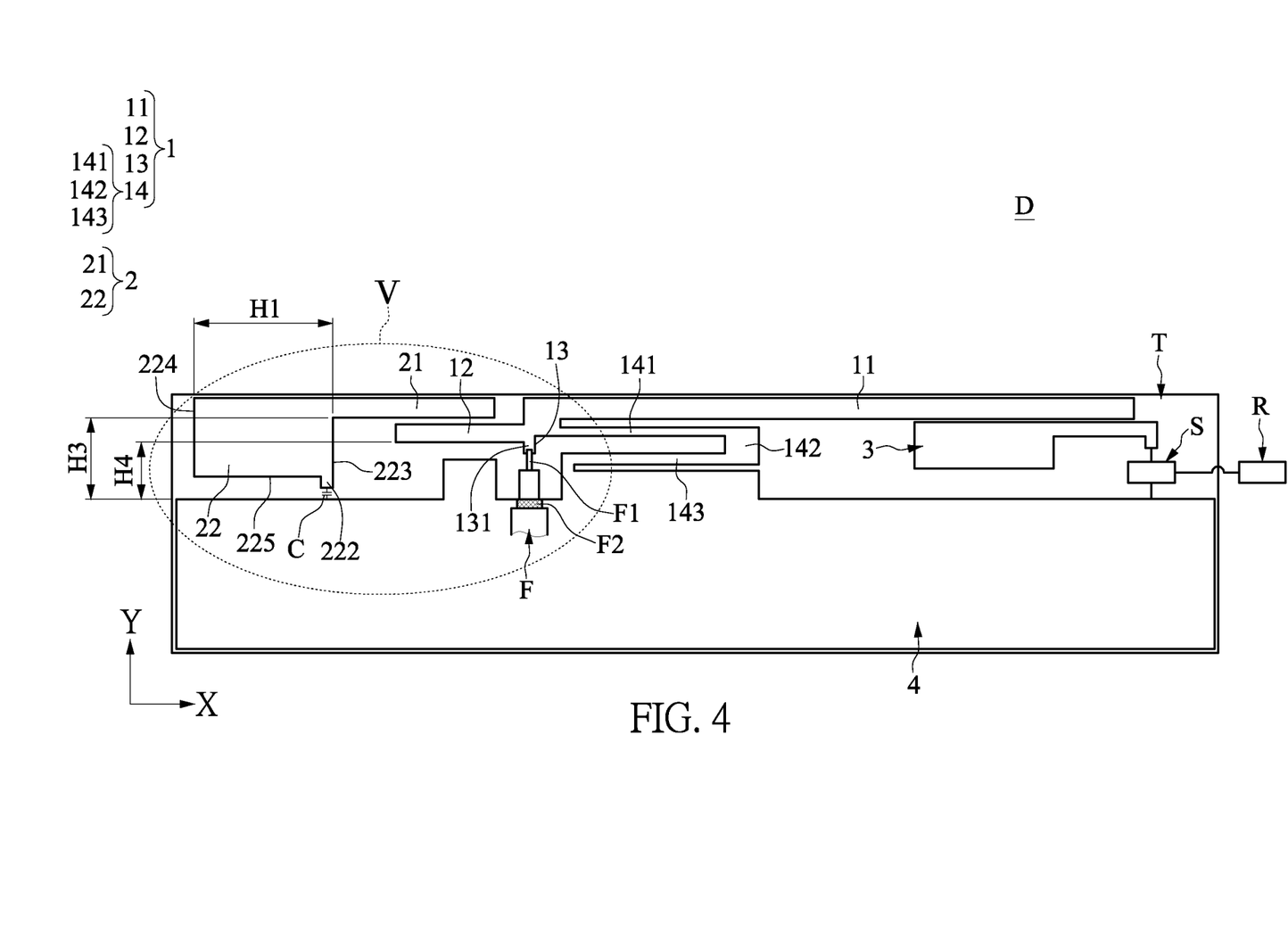
FIG. 4 is a schematic top view of an antenna structure according to a second embodiment of the present disclosure.

Referring to FIG. 4, FIG. 4 is a schematic top view of an electronic device according to a second embodiment of the present disclosure. Comparing FIG. 4 with FIG. 1, the difference between the second embodiment and the first embodiment is in an architecture of the antenna structure. That is to say, the electronic device D provided by the present disclosure can have different forms of the antenna structure. In addition, it should be noted that, other structures of the electronic device D provided by the second embodiment are similar to those in the first embodiment described above, and details are not reiterated herein.

Figure 5:
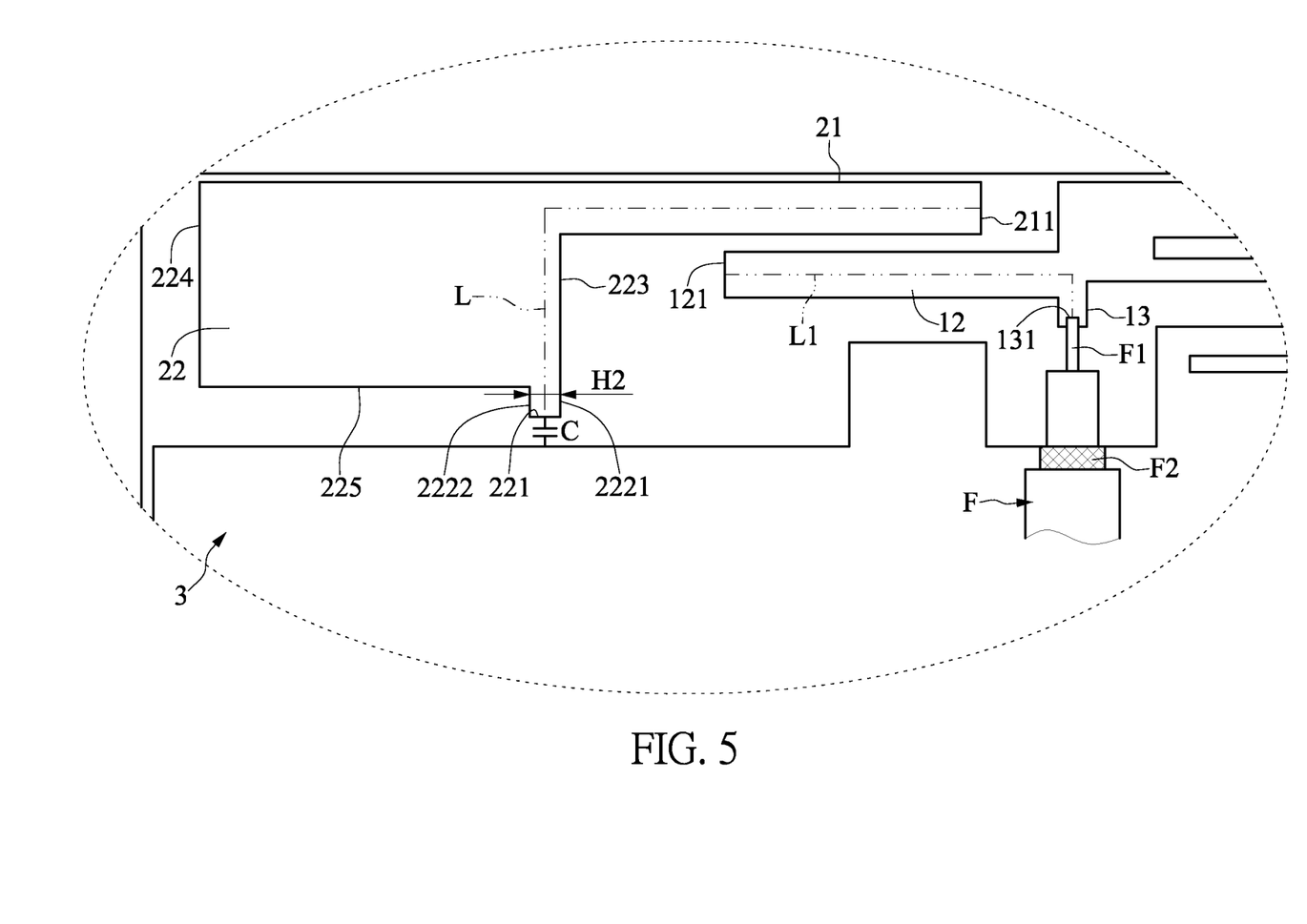
FIG. 5 is an enlarged view of part V of FIG. 4.

Referring further to FIG. 4, which is to be read in conjunction with FIG. 5, FIG. 5 is an enlarged view of part V of FIG. 4. The difference between the second embodiment and the first embodiment is in a different structure of the second radiating member 2. In the present embodiment, a second radiating member 2 includes a third radiating part 21 and a main body part 22 electrically connected to the third radiating part 21. The third radiating part 21 and the second radiating part 12 of the first radiating member 1 are separate from each other and coupling to each other. The main body part 22 includes a fourth radiating part 222 that is electrically connected between the main body part 22 and the capacitance element C. The third radiating part 21 extends along the first direction (the positive X direction) relative to the main body part 22, and the fourth radiating part 222 is connected to a fifth side 225 and extends along the third direction (the negative Y direction) relative to the main body part 22, such that the second radiating member 2 is in a shape of an L. The fourth radiating part 222 has a third side 2221 and a fourth side 2222 that are each connected to the main body part 22 and are arranged opposite to each other. Furthermore, there is a first predetermined distance H1 between the first side 223 and the second side 224, there is a second predetermined distance H2 between the third side 2221 and the fourth side 2222, and the first predetermined distance H1 is greater than twice the second predetermined distance H2.

As mentioned above, furthermore, there is a third predetermined distance H3 between the third radiating part 21 and the grounding member 4, there is a fourth predetermined distance H4 between the second radiating part 12 and the grounding member 4, and the third predetermined distance H3 is not equal to the fourth predetermined distance H4. In the present embodiment, the third predetermined distance H3 is greater than the fourth predetermined distance H4. That is to say, the third radiating part 21 is farther away from the grounding member 4 than the second radiating part 12, such that the gain in the high frequency bandwidth ranging from 1710 MHz to 2300 MHz generated by coupling the third radiating part 21 to the second radiating part 12 is increased.

Next, referring further to FIG. 5, the feeding member F is electrically connected to the feeding end F1 through the feeding point 131, so as to transmit the signals into the feeding part 13. The feeding point 131 and the open end 121 of the second radiating part 12 have a first predetermined length L1, there is an electrical length L between a connection point 221 where the main body part 22 is electrically connected to the capacitance element C and an open end 211 of the third radiating part 21, and the electrical length L is greater than the first predetermined length L1.

In this way, the antenna structure of the present disclosure excites the first operating frequency band of the frequency ranging from 1710 MHz to 2690 MHz through the third radiating part 21 and the second radiating part 12 being separate each other and coupling to each other. In addition, through disposing the capacitance element C in the antenna structure, the high frequency bandwidth of the antenna structure can be adjusted, and the noise interference caused by the adjacent elements (such as magnets) can also be overcome, so as to achieve the high-pass filtering effect.

Third Embodiment

Figure 6:
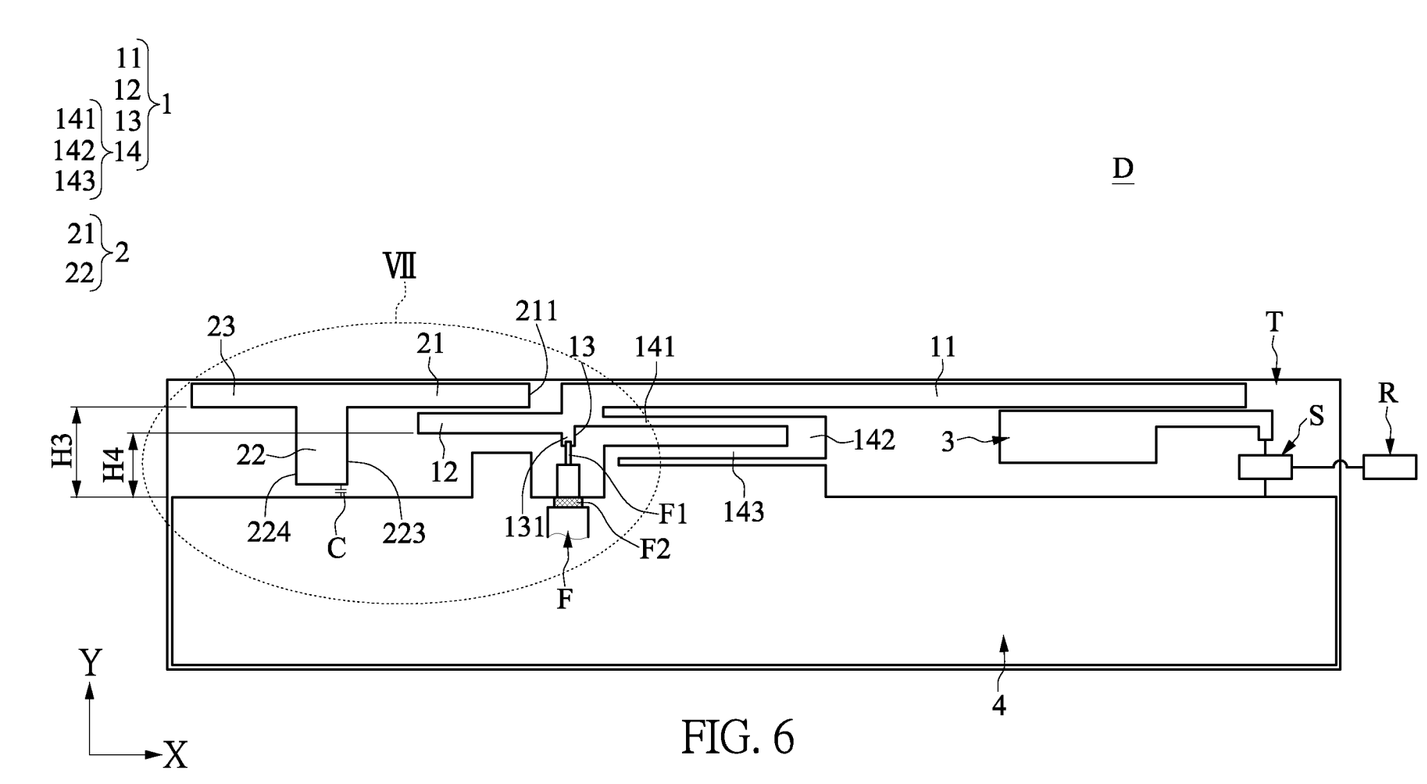
FIG. 6 is a schematic top view of an antenna structure according to a third embodiment of the present disclosure.

Referring to FIG. 6, FIG. 6 is a schematic top view of an electronic device according to a third embodiment of the present disclosure. Comparing FIG. 6 with FIG. 1, the difference between the third embodiment and the first embodiment is in an architecture of the antenna structure. That is to say, the electronic device D provided by the present disclosure can have different forms of the antenna structure. In addition, it should be noted that, other structures of the electronic device D provided by the third embodiment are similar to those in the first embodiment described above, and details are not reiterated herein.

Figure 7:
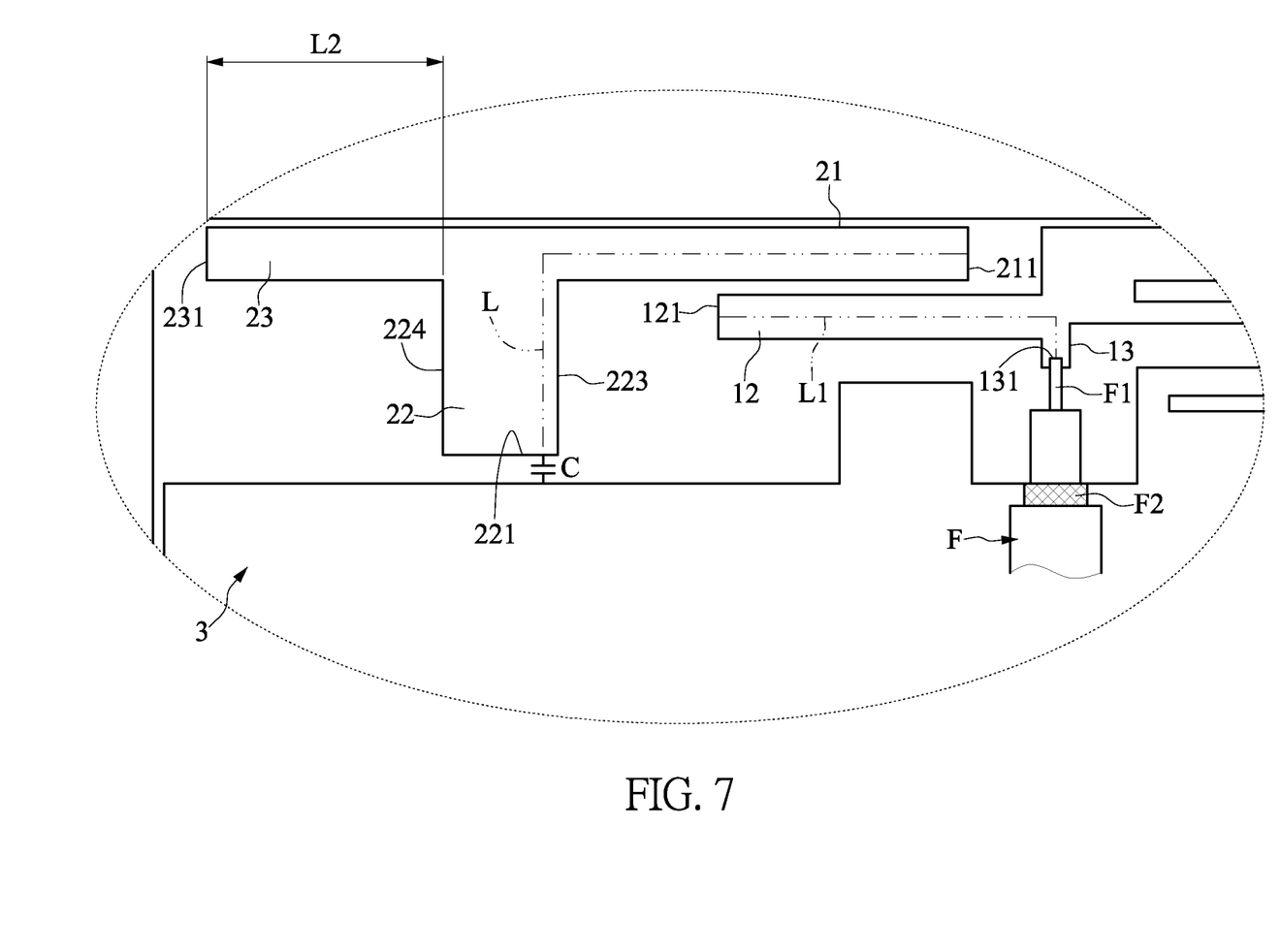
FIG. 7 is an enlarged view of part VII of FIG. 6.

Referring further to FIG. 6, which is to be read in conjunction with FIG. 7, FIG. 7 is an enlarged view of part VII of FIG. 6. The difference between the third embodiment and the first embodiment is in a different structure of the second radiating member 2. In the present embodiment, a second radiating member 2 includes a third radiating part 21, a main body part 22 electrically connected to the third radiating part 21, and a fifth radiating part 23 that is electrically connected to the main body part 22, and a capacitance element C is connected between the second radiating member 2 and the grounding member 4. The third radiating part 21 and the second radiating part 12 of the first radiating member 1 are separate from each other and coupling to each other. The third radiating part 21 extends along the third direction (the positive X direction) relative to the main body part 22, the fifth radiating part 23 extends along a fourth direction (the negative Y direction) relative to the main body part 22, and the third direction is opposite to the fourth direction, such that the second radiating member 2 is in a shape of a T.

Furthermore, there is a third predetermined distance H3 between the third radiating part 21 and the grounding member 4, there is a fourth predetermined distance H4 between the second radiating part 12 and the grounding member 4, and the third predetermined distance H3 is not equal to the fourth predetermined distance H4. It is worth mentioning that, in the present embodiment, the third predetermined distance H3 is greater than the fourth predetermined distance H4.

Next, referring further to FIG. 7, the feeding member F is electrically connected to the feeding end F1 through the feeding point 131, so as to transmit the signals into the feeding part 13. There is a first predetermined length L1 between the feeding point 131 and the open end 121 of the second radiating part 12, there is an electrical length L between a connection point 221 where the main body part 22 is electrically connected to the capacitance element C and an open end 211 of the third radiating part 21, and the electrical length L is greater than the first predetermined length L1. In addition, there is a second predetermined length L2 between a connection point where the fifth radiating part 23 is connected to the main body part 22 and an open end 231 of the fifth radiating part 23, and the second predetermined length L2 is less than the first predetermined length L1. That is to say, a length of the fifth radiating part 23 is less than a length of the second radiating part 12, such that a central frequency generated by the fifth radiating part 23 is greater than a central frequency generated by the second radiating part 12. For example, the fifth radiating part 23 can generate a fourth central frequency of about 3 GHz, which is greater than the second central frequency of about 2500 MHz generated by the second radiating part 12.

Fourth Embodiment

Figure 8:
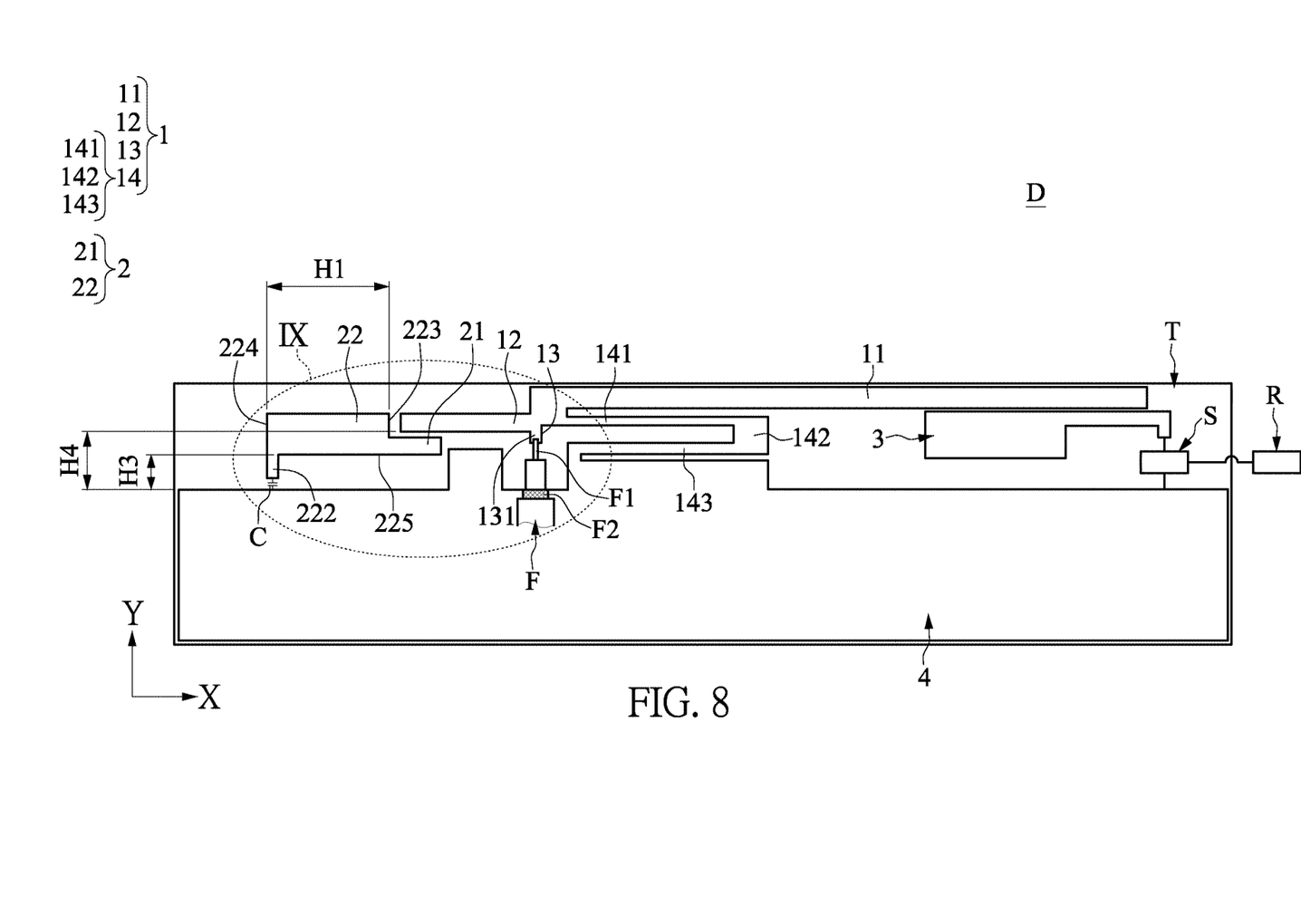
FIG. 8 is a schematic top view of an antenna structure according to a fourth embodiment of the present disclosure.

Referring to FIG. 8, FIG. 8 is a schematic top view of an electronic device according to a fourth embodiment of the present disclosure. Comparing FIG. 8 with FIG. 1, the difference between the fourth embodiment and the first embodiment is in an architecture of the antenna structure. That is to say, the electronic device D provided by the present disclosure can have different forms of the antenna structure. In addition, it should be noted that, other structures of the electronic device D provided by the fourth embodiment are similar to those in the first embodiment described above, and details are not reiterated herein.

Figure 9:
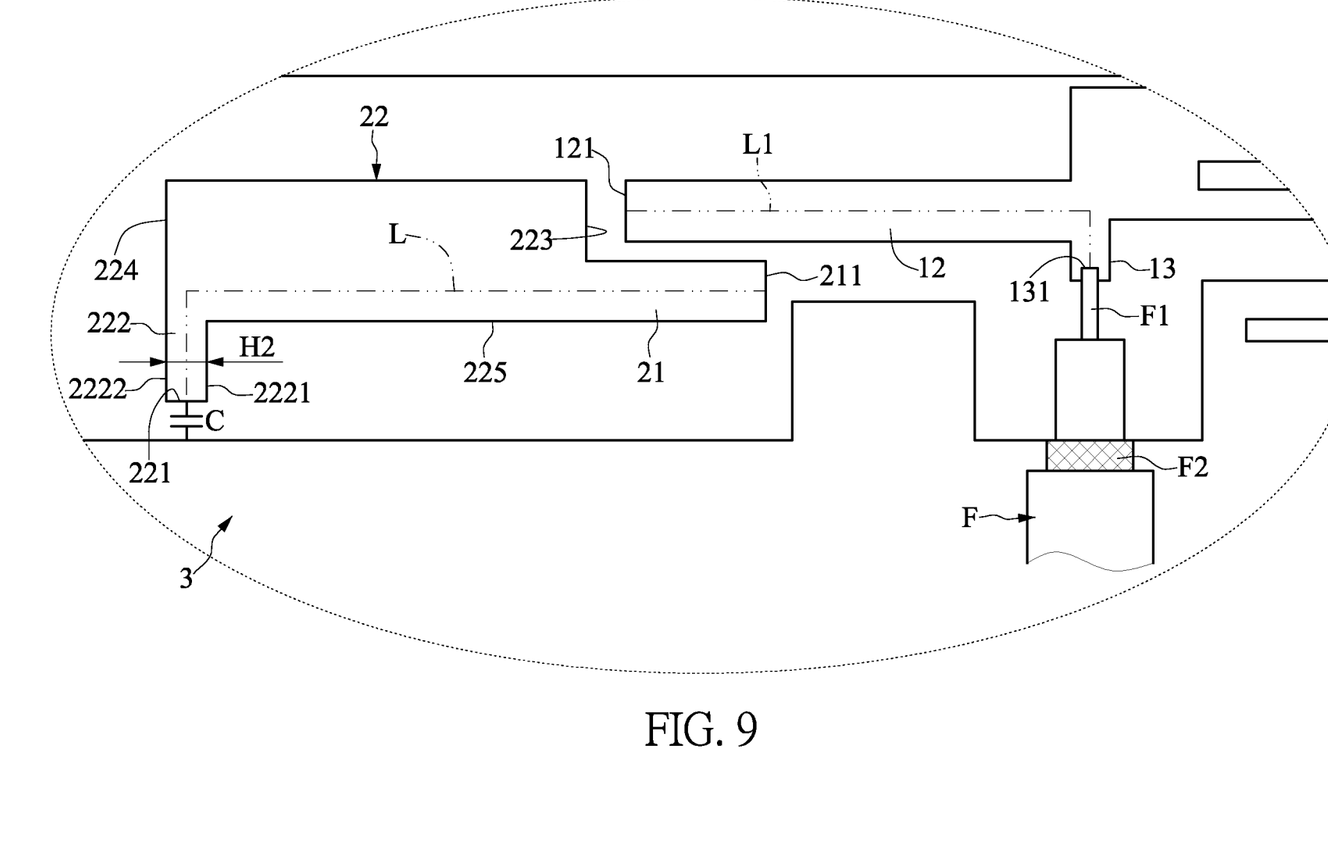
FIG. 9 is an enlarged view of part IX of FIG. 8.

Referring further to FIG. 8, which is to be read in conjunction with FIG. 9, FIG. 9 is an enlarged view of part IX of FIG. 8. The difference between the fourth embodiment and the first embodiment is in a different structure of the second radiating member 2. In the present embodiment, a second radiating member 2 includes a third radiating part 21 and a main body part 22 electrically connected to the third radiating part 21. The third radiating part 21 and the second radiating part 12 of the first radiating member 1 are separate from each other and coupling to each other. The main body part 22 includes a fourth radiating part 222 that is electrically connected between the main body part 22 and the capacitance element C. The third radiating part 21 extends along the first direction (the positive X direction) relative to the main body part 22, the fourth radiating part 222 is connected to the fifth side 225 and extends along the third direction (the negative Y direction) relative to the main body part 22, such that the second radiating member 2 is in a shape of an inverted L. The fourth radiating part 222 has a third side 2221 and a fourth side 2222 that are each connected to the main body part 22 and are arranged opposite to each other. Furthermore, there is a first predetermined distance H1 between the first side 223 and the second side 224, there is a second predetermined distance H2 between the third side 2221 and the fourth side 2222, and the first predetermined distance H1 is greater than twice the second predetermined distance H2. Furthermore, there is a third predetermined distance H3 between the third radiating part 21 and the grounding member 4, there is a fourth predetermined distance H4 between the second radiating part 12 and the grounding member 4, and the third predetermined distance H3 is not equal to the fourth predetermined distance H4. It is worth mentioning that, in the present embodiment, the third predetermined distance H3 is less than the fourth predetermined distance H4, that is, the third radiating part 21 is closer to the grounding member 4 than the second radiating part 12. In this way, the third radiating part 21 is capable of being closer to the grounding member 4 (compared with the second radiating part 12), so as to further adjust and optimize the impedance matching, the return loss value, and/or the radiating effect caused by the antenna structure.

Referring further to FIG. 9, the feeding member F is electrically connected to the feeding end F1 through the feeding point 131, so as to transmit the signals into the feeding part 13. There is a first predetermined length L1 between the feeding point 131 and the open end 121 of the second radiating part 12, there is an electrical length L between a connection point 221 where the main body part 22 is electrically connected to the capacitance element C and an open end 211 of the third radiating part 21, and the electrical length L is greater than the first predetermined length L1.

In this way, the antenna structure excites a first operating frequency band ranging from 1710 MHz to 2690 MHz through the third radiating part 21 and the second radiating part 12 being separate from each other and coupling to each other. In addition, through disposing the capacitance element C in the antenna structure, the high frequency bandwidth of the antenna structure can be adjusted, and the noise interference caused by the adjacent elements (such as magnets) can also be overcome, so as to achieve the high-pass filtering effect.

In addition, it should be noted that, the electrical lengths L (the distance between the connection point where the main body part 22 is electrically connected to the capacitance element C and the open end 211 of the third radiating part 21) in the first to fourth embodiments are different. The length of the electrical length L causes a shift of the high frequency bandwidth, that is, through changing the electrical length L, the operating frequency band, the impedance matching, the return loss value, and/or the radiating effect caused by the antenna structure can be adjusted.

Figure 10:
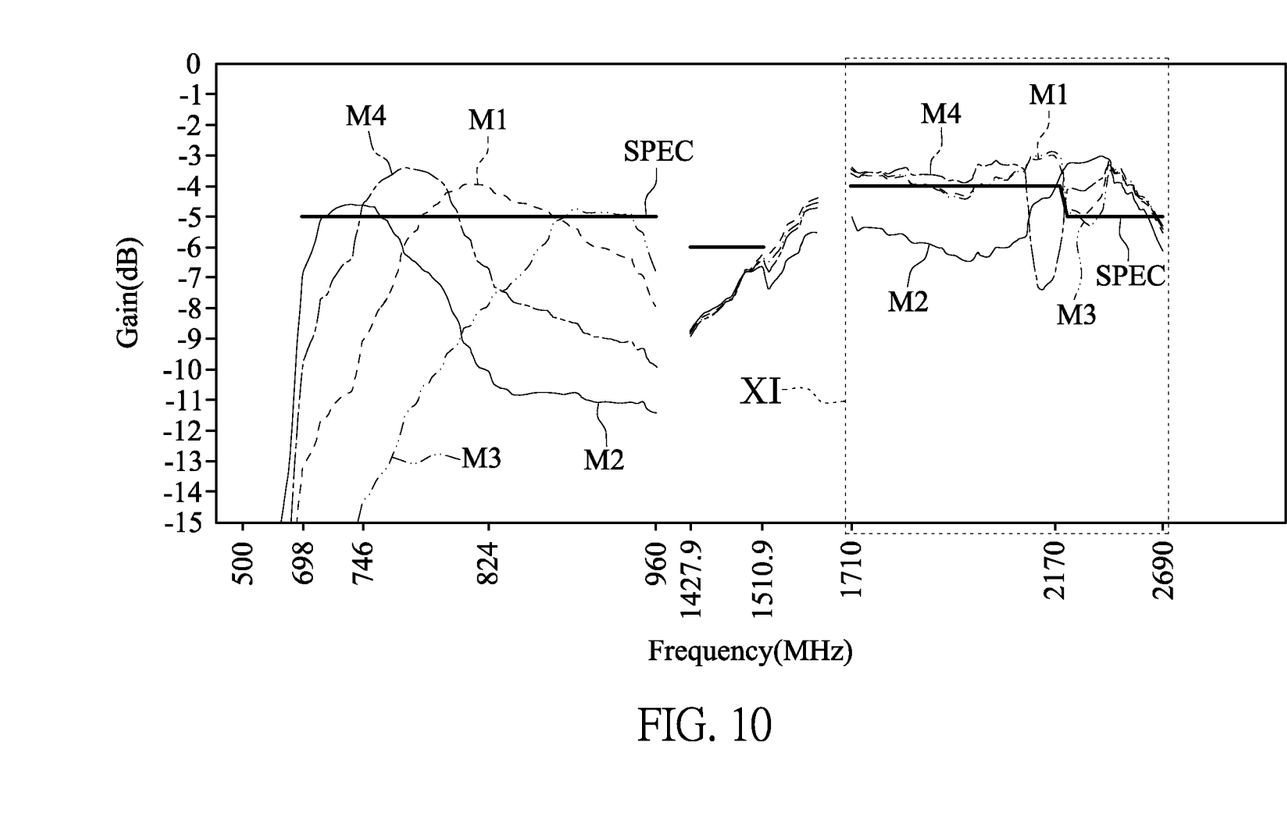
FIG. 10 is a schematic view of a performance of the antenna structure according to the present disclosure.
Figure 11:
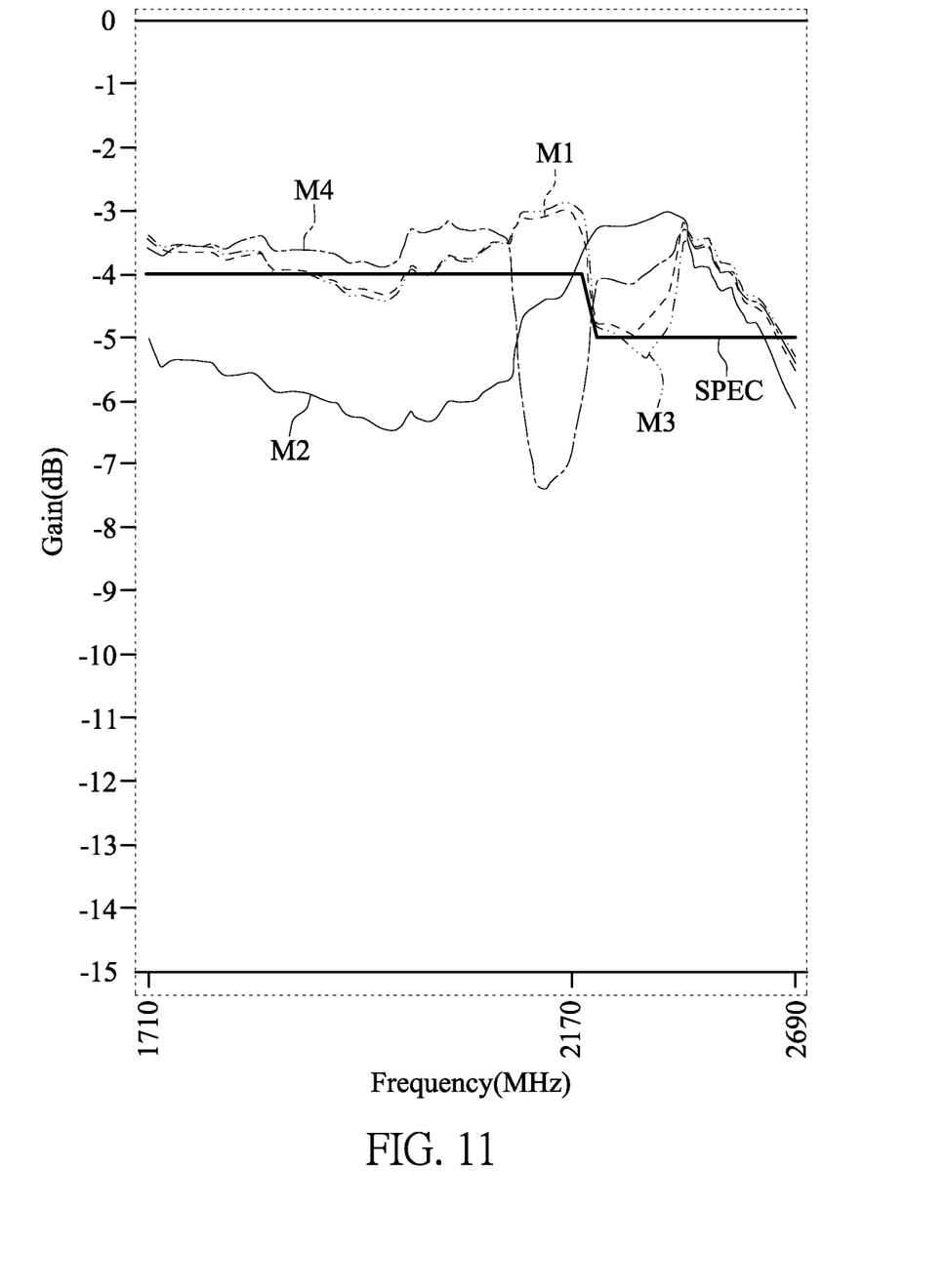
FIG. 11 is an enlarged view of part XI of FIG. 10.

Referring to FIG. 10 and FIG. 11, FIG. 10 is a schematic view of a performance of the antenna structure according to the present disclosure, and FIG. 11 is an enlarged view of part XI of FIG. 10. For example, the first passive component E1 that is connected in series to the second path W2 can be an inductor of 18 nH, and the second passive component E2 that is connected in series to the third path W3 can be a capacitance of 8.2 pF. A curved line M1 in FIG. 10 and FIG. 11 is a curved line showing a return loss of the electronic device D in the first mode. In the first mode, the third radiating member 3 is electrically connected to the control circuit R, and the first change-over switch SW1, the second change-over switch SW2, and the third change-over switch SW3 are each in the non-conducting state. A curved line M2 in FIG. 10 and FIG. 11 is a curved line showing a return loss of the electronic device D in the second mode. In the second mode, the third radiating member 3 is electrically connected to the control circuit R, and the first change-over switch SW1 is in the conducting state, while the second change-over switch SW2 and the third change-over switch SW3 are each in the non-conducting state. A curved line M3 in FIG. 10 and FIG. 11 is a curved line showing a return loss of the electronic device D in the third mode. In the third mode, the third radiating member 3 is electrically connected to the control circuit R, and the second change-over switch SW2 is in the conducting state, while the first change-over switch SW1 and the third change-over switch SW3 are each in the non-conducting state. A curved line M4 in FIG. 10 and FIG. 11 is a curved line showing a return loss of the electronic device D in the fourth mode. In the fourth mode, the third radiating member 3 is electrically connected to the control circuit R, and the third change-over switch SW3 is in the conducting state, while the first change-over switch SW1 and the second change-over switch SW2 are each in the non-conducting state. In this way, as shown in FIG. 10 and FIG. 11, the operating frequency band, the impedance matching, the return loss value, and/or the radiating effect caused by the antenna structure can be adjusted through selecting different paths, so that the bandwidth generated by the antenna structure can meet a user's requirement (i.e., a specification (SPEC) shown in FIG. 10 and FIG. 11).

Beneficial Effects of the Embodiments

In conclusion, in the antenna structure and the electronic device provided by the present disclosure, by virtue of "the third radiating part 21 of the second radiating member 2 and the second radiating part 12 of the first radiating member 1 being separate from each other and coupling to each other" and "there being the first predetermined length L1 between the feeding point 131 of the feeding part 13 and the open end 121 of the second radiating part 12, there being the electrical length L between the connection point 221 where the main body part 22 is electrically connected to the capacitance element C and the open end 211 of the third radiating part 21, and the electrical length L being greater than the first predetermined length L1", the antenna structure of the electronic device D generates the operating frequency band of the frequency ranging from 1710 MHz to 2690 MHz in compliance with the gain specification (i.e., being in compliance with the specification shown in FIG. 10 and FIG. 11).

Furthermore, the antenna structure of the present disclosure excites the first operating frequency band of the frequency ranging from 1710 MHz to 2690 MHz through the third radiating part 21 of the second radiating member 2 and the second radiating part 12 of the first radiating member 1 being separate from each other and coupling to each other, and excites the second operating frequency band of the frequency ranging from 698 MHz to 960 MHz through the first radiating part 11 of the first radiating member 1 and the third radiating member 3 being separate from each other and coupling to each other. In addition, in the present disclosure, the switching circuit S is used to adjust the central frequency of the second operating frequency band in the low frequency ranging from 698 MHz to 960 MHz, and the capacitance element C is connected between the second radiating member 2 and the grounding member 4, so that the high frequency bandwidth of the antenna structure can be adjusted, and the noise interference caused by the adjacent elements (such as magnets) can also be overcome, so as to achieve the high-pass filtering effect.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:
a first radiating member including a first radiating part, a second radiating part, a feeding part, and a grounding part, wherein the feeding part is electrically connected between the first radiating part and the second radiating part, and one end of the grounding part is electrically connected between the first radiating part and the second radiating part;

a second radiating member coupling to the first radiating member, wherein the second radiating member and the first radiating member are separate from each other, the second radiating member includes a third radiating part and a main body part that is electrically connected to the third radiating part, and the third radiating part and the second radiating part are separate from each other and coupling to each other;

a grounding member electrically connected to another end of the grounding part; and a capacitance element connected between the second radiating member and the grounding member;

wherein the feeding part has a feeding point, there is a first predetermined length between the feeding point and an open end of the second radiating part, there is an electrical length between a connection point where the main body part is electrically connected to the capacitance element, and an open end of the third radiating part, and the electrical length is greater than the first predetermined length.

2. The antenna structure according to claim 1, wherein the main body part includes a fourth radiating part, the fourth radiating part is electrically connected between the main body part and the capacitance element, the main body part has a first side connected to the third radiating part and a second side arranged opposite to the first side, and there is a first predetermined distance between the first side and the second side; wherein the fourth radiating part has a third side and a fourth side that are each connected to the main body part and are arranged opposite to each other, and there is a second predetermined distance between the third side and the fourth side; wherein the first predetermined distance is greater than twice the second predetermined distance.

3. The antenna structure according to claim 1, wherein there is a third predetermined distance between the third radiating part and the grounding member, there is a fourth predetermined distance between the second radiating part and the grounding member, and the third predetermined distance is not equal to the fourth predetermined distance.

4. The antenna structure according to claim 1, wherein a capacitance value of the capacitance element is between 0.1 pF and 100 pF.

5. The antenna structure according to claim 1, wherein the first radiating part extends along a first direction relative to the feeding part, the second radiating part extends along a second direction relative to the feeding part, and the first direction is opposite to the second direction.

6. The antenna structure according to claim 1, wherein the second radiating member further includes a fifth radiating part that is electrically connected to the main body part, the third radiating part extends along a third direction relative to the main body part, the fifth radiating part extends along a fourth direction relative to the main body part, and the third direction is opposite to the fourth direction; wherein there is a second predetermined length between a connection point where the fifth radiating part is connected to the main body part and an open end of the fifth radiating part, and the second predetermined length is less than the first predetermined length.

7. The antenna structure according to claim 1, further comprising:

a third radiating member; and a switching circuit electrically connected to the third radiating member;

wherein the third radiating member is coupling to the first radiating member, and through switching the switching circuit, the antenna structure generates an operating frequency band with different central frequencies.

8. The antenna structure according to claim 7, wherein the switching circuit has a first mode and a second mode, the first mode has a first path, and the second mode has a second path; wherein the first path has a first impedance value, the second path has a second impedance value, and the first impedance value is not equal to the second impedance value.

9. An electronic device, comprising:

an antenna structure including:

a first radiating member including a first radiating part, a second radiating part, a feeding part, and a grounding part, wherein the feeding part is electrically connected between the first radiating part and the second radiating part, and one end of the grounding part is electrically connected between the first radiating part and the second radiating part;

a second radiating member coupling to the first radiating member, wherein the second radiating member and the first radiating member are separate from each other, the second radiating member includes a third radiating part and a main body part that is electrically connected to the third radiating part, and the third radiating part and the second radiating part are separate from each other and coupling to each other;

a grounding member electrically connected to another end of the grounding part; and a capacitance element connected between the second radiating member and the grounding member;

wherein there is a first predetermined length between a connection point where the second radiating part is electrically connected to the feeding part and an open end of the second radiating part, there is an electrical length between a connection point where the main body part is electrically connected to the capacitance element and an open end of the third radiating part, and the electrical length is greater than the first predetermined length.

10. The electronic device according to claim 9, wherein the main body part includes a fourth radiating part, the fourth radiating part is electrically connected between the main body part and the capacitance element, the main body part has a first side connected to the third radiating part and a second side arranged opposite to the first side, and there is a first predetermined distance between the first side and the second side; wherein the fourth radiating part has a third side and a fourth side that are each connected to the main body part and are arranged opposite to each other, and there is a second predetermined distance between the third side and the fourth side; wherein the first predetermined distance is greater than twice the second predetermined distance.

11. The electronic device according to claim 9, wherein there is a third predetermined distance between the third radiating part and the grounding member, there is a fourth predetermined distance between the second radiating part and the grounding member, and the third predetermined distance is not equal to the fourth predetermined distance.

12. The electronic device according to claim 9, wherein a capacitance value of the capacitance element is between 0.1 pF and 100 pF.

13. The electronic device according to claim 9, wherein the first radiating part extends along a first direction relative to the feeding part, the second radiating part extends along a second direction relative to the feeding part, and the first direction is opposite to the second direction.

14. The electronic device according to claim 9, wherein the second radiating member further includes a fifth radiating part that is electrically connected to the main body part, the third radiating part extends along a third direction relative to the main body part, the fifth radiating part extends along a fourth direction relative to the main body part, and the third direction is opposite to the fourth direction; wherein there is a second predetermined length between a connection point where the fifth radiating part is connected to the main body part and an open end of the fifth radiating part, and the second predetermined length is less than the first predetermined length.

15. The electronic device according to claim 9, further comprising:
    a third radiating member; and
    a switching circuit electrically connected to the third radiating member;
    wherein the third radiating member is coupling to the first radiating member, and through switching the switching circuit, the antenna structure generates an operating frequency band with different central frequencies.

16. The electronic device according to claim 15, wherein the switching circuit has a first mode and a second mode, the first mode has a first path, and the second mode has a second path; wherein the first path has a first impedance value, the second path has a second impedance value, and the first impedance value is not equal to the second impedance value.

17. The electronic device according to claim 15, further comprising a control circuit electrically connected to the switching circuit, wherein the control circuit controls the switching circuit to switch to one of a first mode and a second mode.

* * * * *